Sept. 24, 1963 R. H. KINGDON 3,105,173
ELECTRICAL PANELBOARD
Filed Feb. 16, 1955 3 Sheets-Sheet 1
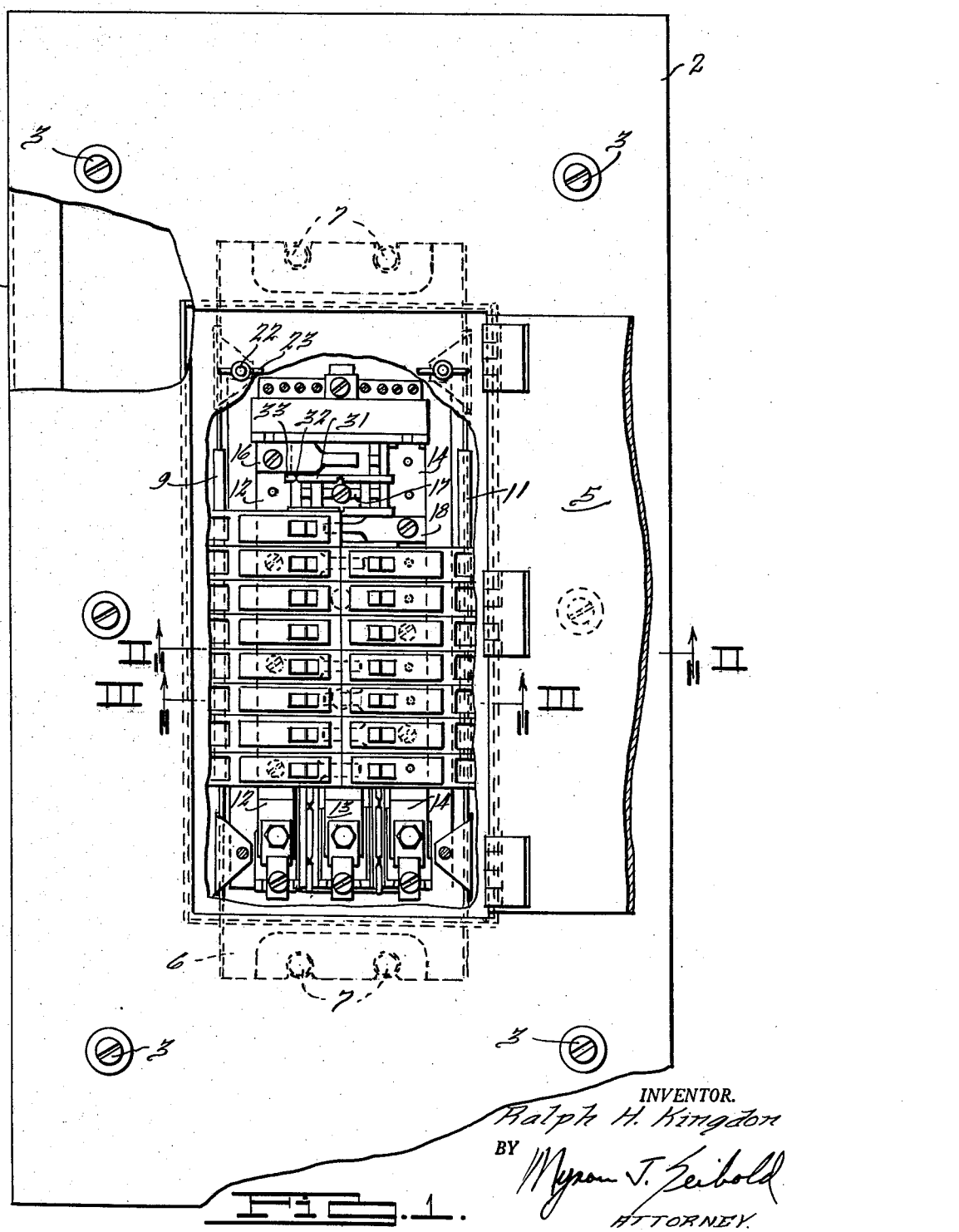
INVENTOR.
Ralph H. Kingdon
BY Myron J. Seibold
ATTORNEY.

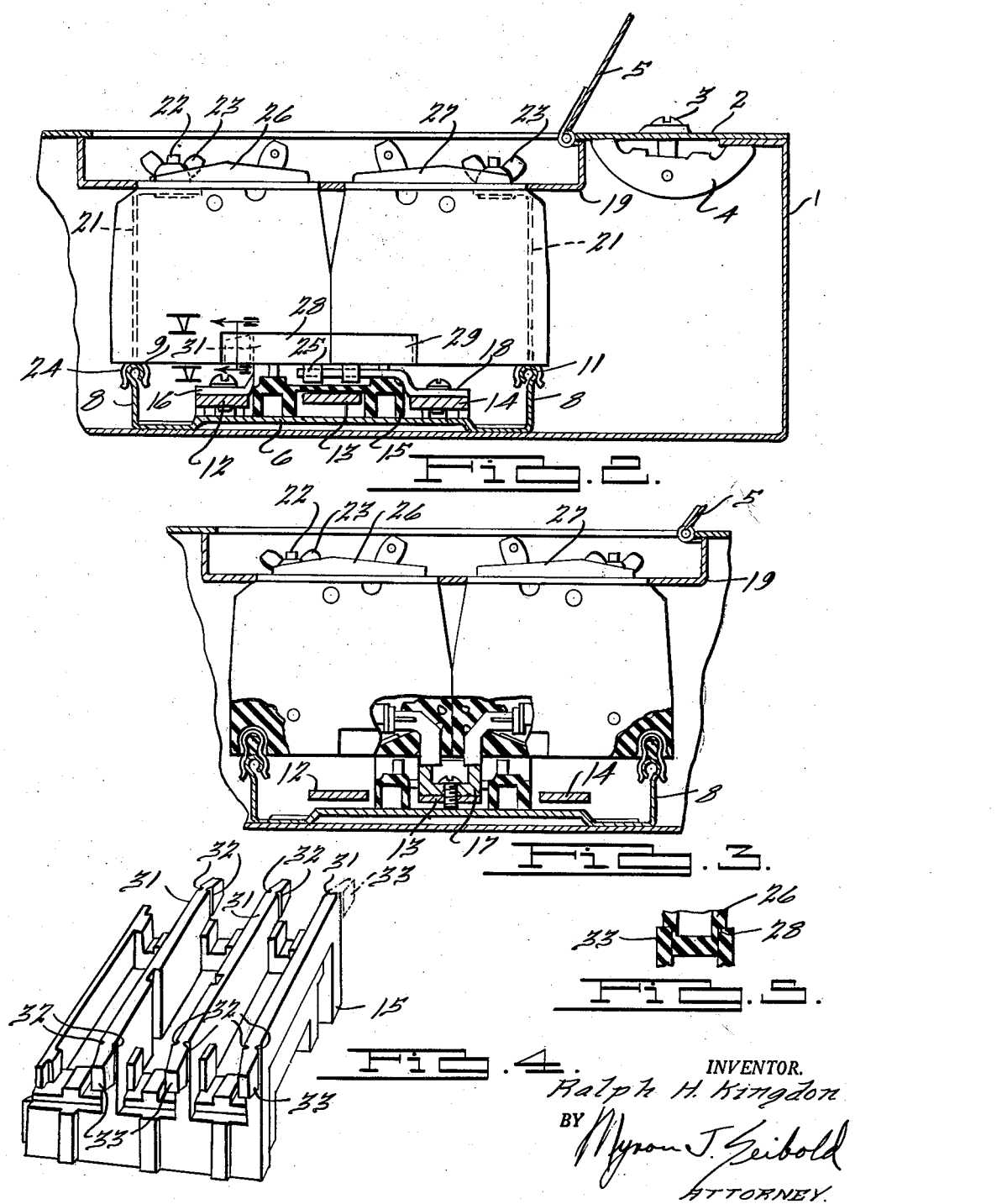

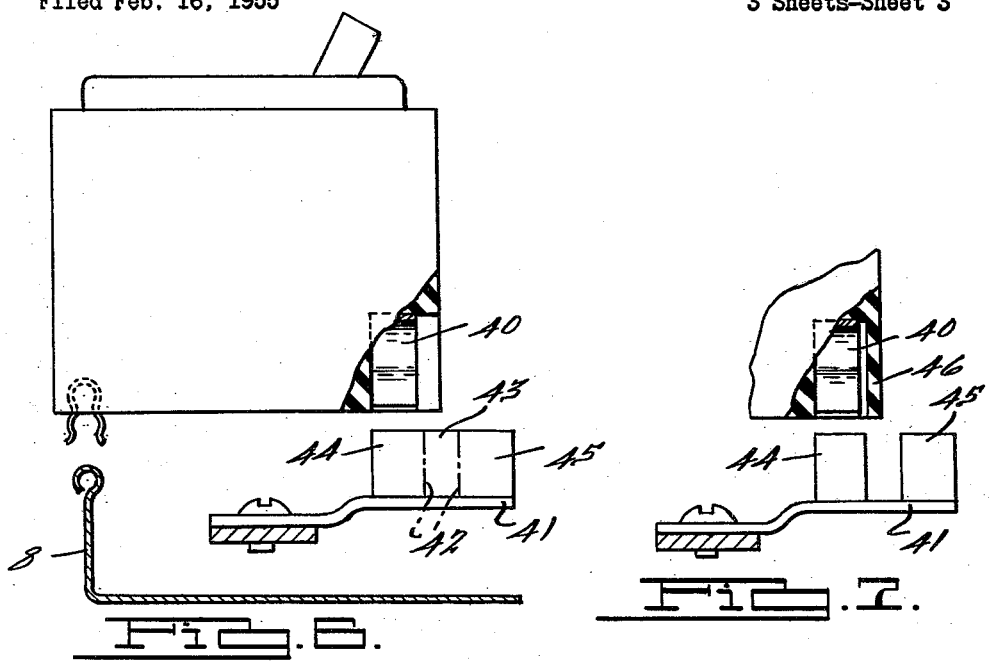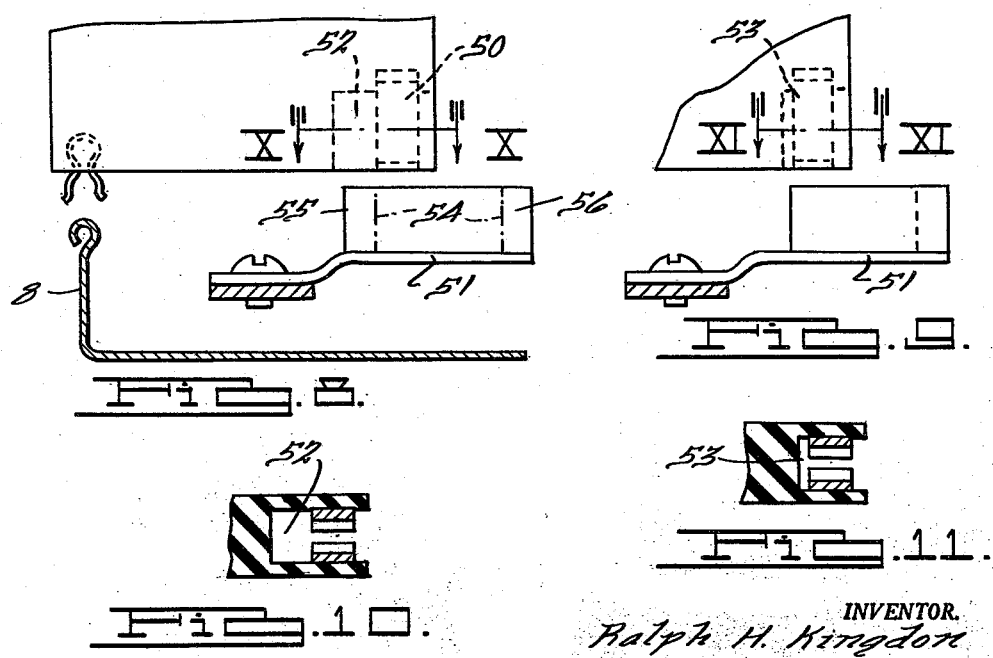

3,105,173
ELECTRICAL PANELBOARD
Ralph H. Kingdon, Birmingham, Mich., assignor to Square D Company, Detroit, Mich., a corporation of Michigan
Filed Feb. 16, 1955, Ser. No. 488,664
13 Claims. (Cl. 317—119)

This invention relates to power distribution equipment and more particularly to a panelboard mounting means having a non-interchangeability feature for automatic electric circuit breakers wherein the mounting means may be modified to accommodate circuit breakers other than those of selected ratings intended to be mounted in the panelboard.

The object of the present invention is the provision of electrical distribution equipment wherein circuit control devices of one rating or group of ratings will normally be accommodated and wherein devices of a second rating or group of ratings may be accommodated but where a physical adaptation must be made in the equipment to accommodate the devices of the second rating.

A further object of the present invention in accordance with the preceding object is the provision of an electric circuit breaker panelboard having portions thereof removable for the accommodation of automatic circuit breakers of different ratings, the circuit breakers being substantially similar in physical characteristics but differing in physical contour in accordance with the ratings, the removable portions when in fixed position prohibiting the accommodation of circuit breakers of the higher ratings.

A further object of the present invention in accordance with the preceding objects is the provision of a mounting means for automatic electric circuit breakers having a base portion of insulating material and wherein the base portion is provided with removable portions normally receiving circuit breakers of low rating while prohibiting accommodation of breakers of higher rating and removable to receive the breakers of higher rating.

A further object of the present invention in accordance with the first two objects is a mounting means for automatic electric circuit breakers including conducting connectors to which the breakers are connected, the connectors being provided with removable portions for the accommodation of circuit breakers of ratings other than those for which the mounting means was originally intended.

Other objects and features of the invention will be readily apparent to those skilled in the art from the specification and appended drawings illustrating certain preferred embodiments in which:

FIGURE 1 is a front elevational view of the panelboard of the present invention with portions of the box and cover broken away to show internal parts.

FIGURE 2 is a sectional view along the lines II—II of FIGURE 1.

FIGURE 3 is a sectional view taken along the lines III—III of FIGURE 1.

FIGURE 4 is a perspective view of a portion of an insulating base section of the panelboard of the present invention.

FIGURE 5 is a sectional view taken along the lines V—V of FIGURE 2.

FIGURE 6 is a partial sectional view of a modified form of the panelboard of the present invention.

FIGURE 7 is a partial sectional view of a portion of FIGURE 6 showing the adaptation of the mounting means of FIGURE 6 for circuit equipment of higher ratings.

FIGURE 8 is a partial sectional view of a modified form of the mounting means of the present invention.

FIGURE 9 is a partial sectional view of a portion of FIGURE 8 showing the mounting means as adapted for the accommodation of circuit equipment of higher ratings.

FIGURE 10 is a sectional view taken along the lines X—X of FIGURE 8.

FIGURE 11 is a sectional view taken along the line XI—XI of FIGURE 9.

The panelboard, according to the present invention, comprises a sheet metal box 1 having a trim cover 2 normally secured to the box 1 by screws 3 engaging trim clamps 4, and is provided with a hinged central cover 5 permitting access to circuit controlling devices within the panelboard.

Within the box 1 there is supported an interior which is more fully described and explained in copending application of Harris I. Stanback and Ralph H. Kingdon, Serial No. 483,048 filed January 20, 1955, for Electrical Panelboard, and now Patent No. 2,902,632, issued September 1, 1959. For the purposes of this disclosure the interior comprises a sheet metal base member 6 secured to the bottom of the box 1 at studs 7 with the sides thereof upwardly turned at 8 and returned looped upon themselves to present continuous rolled over mounting beads or bars at 9 and 11 which extend substantially the entire length of the interior. Supported on suitable bus end support members mounted to the interior base 6 are a plurality of electrical buses 12, 13 and 14 to which may be connected a three phase power supply system for the energization of a plurality of electrical loads through the electrical circuit control devices mounted within the panelboard. Spaced along the base member 6 are a plurality of insulating bases 15 spacing the buses 12, 13 and 14 and providing alignment and support for electrical terminal attachment buses as at 16, 17 and 18 for the three separate phases. A trim pan 19 is supported on the interior by end brackets 21 having studs 22 thereon to which the interior pan 19 may be secured by suitable nuts as at 23. The interior pan 19 is provided with central cutout portions through which will extend the operating handles of the circuit control devices to be mounted in the panelboard and to which access may be had from the front of the panelboard when the hinged door 5 is open; the interior pan 19 otherwise preventing access to the electrical wiring for the devices mounted within the panelboard.

The method of mounting the circuit control equipment to be used with the panelboard of the present invention constitutes the employment of a circuit breaker having at one end a spring clip jaw 24 and its other end a spring clip terminal jaw 25 with the opening axes of the jaws 24 and 25 rotated 90 degrees with respect to each other.

With the cover 2 and trim pan 19 removed, individual circuit breakers are easily mounted within the panelboard without any mechanical or electrical attachement other than that provided by the engagement of the spring clip jaws 24 and 25. This engagement may be effected by simply pressing the breakers inwardly with the terminal jaw 25 embracing one of the terminal attachment buses 16, 17 or 18 and with the spring clip jaw 24 embracing one of the mounting beads or bars 9 or 11. The terminal jaw 25 engagement with one of the terminal attachment buses 16, 17 or 18 will contitute the line terminal connection for the circuit breaker and the load terminal connection, not shown, may be made either before or after the unit is mounted in the panelboard, this being effected in conventional manner by normal circuit wiring. The jaw 25 and terminal attachment bus engagement as well as other elements as will hereinafter be described will locate the units longitudinally of the panelboard and the jaw 24 and mounting bar 9 or 11 engagement will locate the units transversely of the panelboard. Removal of the circuit breakers is effected just as easily as its attachment by simply pulling the unit to release its resilient spring clip jaw connections.

It is the object of this invention to provide a means for accommodating circuit breakers of at least two different current-carrying capacities or ratings within the panelboard as heretofore described and to provide in the construction of the panelboard an arrangement whereby circuit breakers of higher ratings may be mounted in the panelboard only after a conscious manipulation or adjustment of the panelboard has been made so that circuit breakers of higher rated capacities may not be unintentionally mounted within the panelboard. To accomplish this purpose the circuit breakers to be employed with the panelboard are provided with a physical contour differentiation between circuit breakers of lower rated capacities and those of higher rated capacities. For this purpose a preferable form of differentiation is shown in FIGURES 2 and 3 of the drawings wherein two circuit breakers 26 and 27 are shown in mounted position. Of these two circuit breakers, circuit breaker 26 as illustrated is a lower rating circuit breaker which may have a rating, for example, of 15 or 20 amperes while circuit breaker 27 illustrates a breaker of higher rating, such for example as 30, 40 or 50 amperes. The difference in the breakers as disclosed is in the lower side corners at the terminal jaw end and is constituted by grooves in the opposite sides of the circuit breaker which, in the case of the lower rated circuit breaker, are long grooves extending along the bottom of the side of the breaker toward the hinge terminal 24 as shown at 28 and, in the case of the higher rated circuit breaker, grooves of similar depth and width but extending a shorter distance toward the hinge jaw 24 thereof as shown at 29.

In FIGURE 4 is shown one unit of the insulating base of the interior of the panelboard constituting a plurality of compartments into which will extend the terminal attachment buses 16, 17 and 18 secured to the energization buses 12, 13 and 14 as previously described. It should be noted that the terminal attachment buses 16 and 18 are secured to their respective buses 12 and 14 by suitable screws as shown and extend beyond the center of the insulation base so as to allow access to the terminal attachment bus for terminal jaws 25 of circuit breakers mounted at opposite sides of the panelboard. The terminal attachment bus associated with the central bus 13 will extend through a central hole in the insulation 15 and will be of such dimensions as to also accommodate circuit breakers mounted to either or both of the mounting bars 9 or 11 on the base member 6. Separating each of the terminal attachment bus members 16, 17 and 18 are insulation barriers 31 molded integrally with the insulation base 15 and scored as shown at 32 in FIGURE 4 to provide for easy removal of the ends 33 thereof for the accommodation of circuit breakers of higher ratings as will now be described.

In FIGURE 2 is shown the mounted position in the panelboard of a circuit breaker of a low rated capacity and a circuit breaker of a high rated capacity, and, in dotted lines, the position of the end 33 of the insulation barrier 31 of the insulation base 15 and its relationship to the groove 28 in the side plate of the circuit breaker 26. It should be noted that when the end 33 of the insulation barrier 31 is retained in position a circuit breaker having only a short groove as shown at 29 in circuit breaker 27 will not be permitted to be placed into a position where its terminal clip 25 will engage one of the terminal bus members 16, 17 or 18 because of the interference of the end 33 of the insulation barrier 31 with the side of the breaker beyond the grooves. On the other hand, when the ends 33 are removed, as is shown at the right-hand mounted circuit breaker of FIGURE 2, a circuit breaker of a higher rated capacity may be placed in a position where its terminal jaw 25 will be in cooperating relationship with one of the terminal buses 16, 17 or 18. It may now be seen that when the insulation base is supplied with all of its ends 33 in position, a circuit breaker of a higher rated capacity may be employed with the panelboard only after a conscious manipulation of the mounting means of the panel has been effected by the removal of the ends 33 so that if the higher rated capacity breaker is used it will be used with the realization that a change has been made in the accommodation arrangement within the panelboard.

In FIGURES 6 through 11 are shown modified forms of the mounting arrangement of the present invention whereby circuit breakers of higher capacity may be employed with a panelboard having an original arrangement for lower ratings and in which, when the circuit breaker of a higher rated capacity is employed, a conscious overt act must be performed on the previous mounting arrangement to enable the higher rated circuit breaker to be mounted. In FIGURES 6 and 7 is shown one modified form wherein the terminal attachment bus 41 is provided with an upturned blade rather than just the extending prong as shown in the previously described form. The terminal attachment bus 41 of this modification is provided with vertical scoring at 42 permitting the removal of a central portion 43 while retaining the terminal blade portions 44 and 45 for the right-hand and left-hand breakers in the panel. The circuit breakers for use with this modified form have internal terminal jaws 40 and end barriers 46 in the base thereof as shown in FIGURE 7 for higher ratings or without the end barrier as shown in the circuit breaker of FIGURE 6 for lower rated circuit breakers. It may be seen that a circuit breaker having a higher rating may not be engaged with the terminal attachment bus 41 due to the engagement of the barrier 46 with the unremoved portion 43 of a panelboard having the original low rated construction. It may also be seen that circuit breakers of a lower rated capacity may be inserted into cooperating relationship with the terminal bus 41 while the central portion of the bus is retained in position and may likewise be inserted into cooperating relationship with the terminal bus after the central portion 43 has been removed for the accommodation of higher rated circuit breakers. It should be understood that the barrier 46 may be of the same molded insulation material from which the case of the circuit breaker is manufactured, as shown in FIGURE 7, or may be a plate of any suitable material which may be attached to the circuit breaker during manufacture in accordance with the rating of the breaker.

In FIGURES 8 and 9 is shown a second modification of the present invention employing a terminal attachment bus 51 having an upturned blade portion similar to that shown in FIGURES 6 and 7. In this modified form of the invention the terminal jaw 50 of the circuit breaker is supported in a slot in the base of the circuit breaker, the slot being of a different lengthwise dimension for circuit breakers of lower and higher rated capacities, FIGURES 8 and 10 illustrating a circuit breaker of lower rated capacities with an extended slot 52 and FIGURES 9 and 11 illustrating a circuit breaker of higher rated capacity with a shorter slot 53. The blade of the terminal attachment bus 51 of this modification is scored at 54 to provide for the removal of the ends 55 and 56 for the accommodation of circuit breakers of the higher rated capacity, FIGURE 9 illustrating the terminal bus 51 with end 55 removed for the accommodation of the higher rated circuit breaker.

The term "panelboard" as used herein is intended to include panels, panelettes, load centers and similar assemblages of automatic electric circuit breakers.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electrical panelboard comprising a plurality of bus conductors, a plurality of automatic electric circuit breakers, means for mounting said breakers in front of and in cooperating relationship with said bus conductors, panel registry means extending forwardly of said bus conductors, circuit breaker registry means on some of said breakers adapted to register with said panel registry means, other of said breakers having different operating characteristics and differing in the characteristics of their registry means, and at least some of said panel registry means having removable portions to allow for mounting of said other breakers of said different operating characteristics in the panelboard.

2. An electrical panelboard comprising a plurality of bus conductors, a plurality of insulating bus spacers, panel registry means on said spacers, respectively, a predetermined selection of automatic electric circuit breakers, means for mounting said breakers in said panelboard, circuit breaker registry means on said breakers registering with said panel registry means, said panel registry means on said spacers being removable to permit mounting of breakers of other than said predetermined selection of breakers.

3. An electrical panelboard comprising a plurality of bus conductors, a plurality of insulating bus spacers, a plurality of automatic electric circuit breakers having a particular operating characteristic, means for mounting said breakers in said panelboard in electrical connection with said bus conductors, respectively, panel registry means on said spacers respectively, circuit breaker registry means on said circuit breakers, respectively, cooperating with said panel registry means to permit mounting of said breakers having said particular operating characteristics and to prohibit mounting of breakers having different operating characteristics said prohibited breakers differing from said mountable breakers in the characteristics of said circuit breaker registry means, said panel registry means on said spacers being removable to permit mounting of said breakers having different operating characteristics in the panelboard.

4. An electrical panelboard comprising a plurality of bus conductors, a plurality of insulating bus spacers, a plurality of automatic electric circuit breakers having particular operating characteristics, means for mounting said breakers in said panelboard, recess means of predetermined character on said breakers, respectively, panel registry means on said bus spacers for registering with said recess means to permit mounting of breakers having said recess means and to prohibit mounting of breakers differing from said mountable breakers in the character of said recess means, said panel registry means on said bus spacers being removable to permit mounting of breakers having recess means of different character in the panelboard.

5. An electrical panelboard comprising a plurality of bus conductors, a plurality of insulating bus spacers, a plurality of terminal conductors connected to said bus conductors, a plurality of automatic electric circuit breakers, means for mounting said breakers in said panelboard, circuit breaker registry means on said breakers, panel registry means on said terminal conductors registering with said circuit breaker registry means on said breakers to permit mounting of breakers having said circuit breaker registry means and prohibiting mounting of breakers differing from said mountable breakers in the characteristics of said circuit breaker registry means thereon, said panel registry means on said terminal conductor being removable to permit mounting of breakers having different circuit breaker registry means in the panelboard.

6. An electrical panelboard comprising a plurality of conductors having terminal blade portions, a plurality of automatic electric circuit breakers, means for mounting said breakers in said panelboard in contact with said blade portions, respectively, circuit breaker registry means on said circuit breakers cooperating with said blade portions to permit mounting of breakers having said circuit breaker registry means but prohibiting mounting of breakers differing in the characteristics of said circuit breaker registry means, part of said terminal blade portions being removable to permit mounting of breakers having different circuit breaker registry means in the panelboard.

7. An electrical panelboard comprising a mounting panel, a circuit breaker mounting means secured to said mounting panel, panel registry means mounted in fixed relation with said mounting panel and extending forwardly thereof, an electric circuit breaker having a registry means, said circuit breaker being mounted on said mounting means, and an undercut section on said panel registry means to facilitate removal of a portion thereof whereby circuit breakers not provided with said circuit breaker registry means may be mounted on said mounting means.

8. An electrical panelboard comprising a supporting panel, a first and a second circuit breaker, means on said panel for mounting said circuit breakers on said panel, panel registry means on said panel, a first circuit breaker registry means on said first circuit breaker arranged to cooperate with said panel registry means to permit mounting of said first circuit breaker on said panel, a second circuit breaker registry means on said second circuit breaker normally arranged to interfere with said panel registry means to prevent mounting of said second circuit breaker on said panel, and said panel registry means having a removable portion so disposed that upon removal thereof said second circuit breaker registry means is arranged to cooperate with said panel registry means to permit mounting of said second circuit breaker on said panel.

9. The electrical panelboard of claim 8 characterized in that said removable portion is identified by a scoring mark on its associated registry means that also facilitates its removal.

10. An electrical panelboard comprising a supporting panel, a first and a second circuit breaker, means on said panel for mounting said circuit breakers on said panel, a plurality of panel registry means on said panel, a first circuit breaker registry means on said first circuit breaker arranged to cooperate with any one of said panel registry means to permit mounting of said first circuit breaker on said panel, a second circuit breaker registry means on said second circuit breaker normally arranged to interfere with each of said panel registry means to prevent mounting of said second circuit breaker on said panel, and each of said panel registry means having a removable portion so disposed that upon removal thereof said second circuit breaker registry means is arranged to cooperate with that one of said panel registry means to permit mounting of said second circuit breaker on said panel.

11. In a circuit breaker having manually operable make and break contacts enclosed within a casing, a terminal contact located at a corner of said casing for engagement with an externally fixed terminal blade, said casing having an opening extending about the corner thereof adjacent said terminal contact, and an obstruction affixed within the casing extending alongside said terminal contact at said opening and incompletely closing said opening to interfere with egagement between said terminal contact and a fixed terminal blade of dimension larger than the unclosed part of said opening.

12. An electrical panelboard and circuit breaker combination comprising a plurality of bus conductors mounted in spaced relationship to each other, a plurality of automatic electric circuit breakers, each of said circuit breakers having means for mounting it in electrically conducting relationship with at least one of said bus conductors, a plurality of panelboard registry means on said panelboard, some of said circuit breakers having certain operating characteristics and having circuit breaker registry means adapted to register with said panelboard registry means thereby to permit each of said some of said circuit breakers to be mounted in electrically conducting relationship with at least one of said bus conductors, others of said circuit breakers having operating characteristics differing from said certain operating characteristics of said some of said circuit breakers and having different circuit breaker registry means physically different from the circuit breaker registry means of said some of said circuit breakers whereby said different circuit breaker registry means on said others of said circuit breakers interfere with said panelboard registry means thereby to prevent said others of said circuit breakers from being mounted in electrically conducting relationship with any of said bus conductors, and at least some of said panelboard registry means having portions removable to permit each of said others of said circuit breakers of said different operating characteristics to be mounted in electrically conducting relationship with at least one of said bus conductors.

13. An electrical panelboard comprising a supporting structure, a plurality of bus conductors carried by said supporting structure, a plurality of automatic electric circuit breakers, each of said circuit breakers having means for holding it on said supporting structure in electrically conducting relationship with at least one of said bus conductors, a plurality of panelboard registry means on said supporting structure, some of said circuit breakers having certain operating characteristics and having circuit breaker registry means adapted to register with said panelboard registry means thereby to permit each of said some of said circuit breakers to be held on said supporting structure in electrically conducting relationship with at least one of said bus conductors, others of said circuit breakers having operating characteristics differing from said certain operating characteristics of said some of said circuit breakers and having different circuit breaker registry means physically different from the circuit breaker registry means of said some of said circuit breakers whereby said different circuit breaker registry means on said others of said circuit breakers interfere with said panelboard registry means thereby to prevent said others of said circuit breakers from being held on said supporting structure in electrically conducting relationship with any of said bus conductors, and at least some of said panelboard registry means having portions removable to permit each of said others of said circuit breakers of said different operating characteristics to be held on the supporting structure in electrically conducting relationship with at least one of said bus conductors.

References Cited in the file of this patent

UNITED STATES PATENTS

| | | |
|---|---|---|
| 2,199,626 | Freese | May 7, 1940 |
| 2,281,958 | Snavely | May 5, 1942 |
| 2,647,225 | Cole | July 28, 1953 |
| 2,766,405 | Edmunds | Oct. 9, 1956 |

FOREIGN PATENTS

| | | |
|---|---|---|
| 502,056 | Canada | May 4, 1954 |

OTHER REFERENCES

Federal Noark Catalogue 1000A, July 1953, pages 1, 2, and 3.